United States Patent [19]
Leifer et al.

[11] 3,977,624
[45] Aug. 31, 1976

[54] LOCKING AND DRIVE MECHANISM FOR MAGNETIC TAPE CARTRIDGE

[75] Inventors: Noel Arthur Leifer, Pine Brook; Jack Drake Raymore, Convent Station, both of N.J.

[73] Assignee: Bell Telephone Laboratories, Incorporated, Murray Hill, N.J.

[22] Filed: May 30, 1975

[21] Appl. No.: 582,143

[52] U.S. Cl. .............................................. 242/198
[51] Int. Cl.² ................... G03B 1/04; G11B 15/32; G11B 23/04
[58] Field of Search ............................ 242/197–200, 242/55.19 A; 360/93, 96; 352/72, 78 R; 95/31

[56] References Cited
UNITED STATES PATENTS

| | | |
|---|---|---|
| 3,612,432 | 10/1971 | Johnson .............................. 242/198 |
| 3,628,754 | 12/1971 | Fujikawa ............................. 242/198 |
| 3,656,704 | 4/1972 | Ogura ................................. 242/198 |
| 3,811,758 | 5/1974 | Riedel ................................. 352/72 |

*Primary Examiner*—Leonard D. Christian
*Attorney, Agent, or Firm*—C. E. Graves

[57] ABSTRACT

Positioning a magnetic tape cartridge with respect to a stationary capstan drive is achieved with great accuracy in this invention by simple overcenter loading cams which bias the cartridge horizontally against the capstan drive, as well as vertically against reference surfaces. The cartridge is thus reliably positioned with precision in the tape recorder.

6 Claims, 5 Drawing Figures

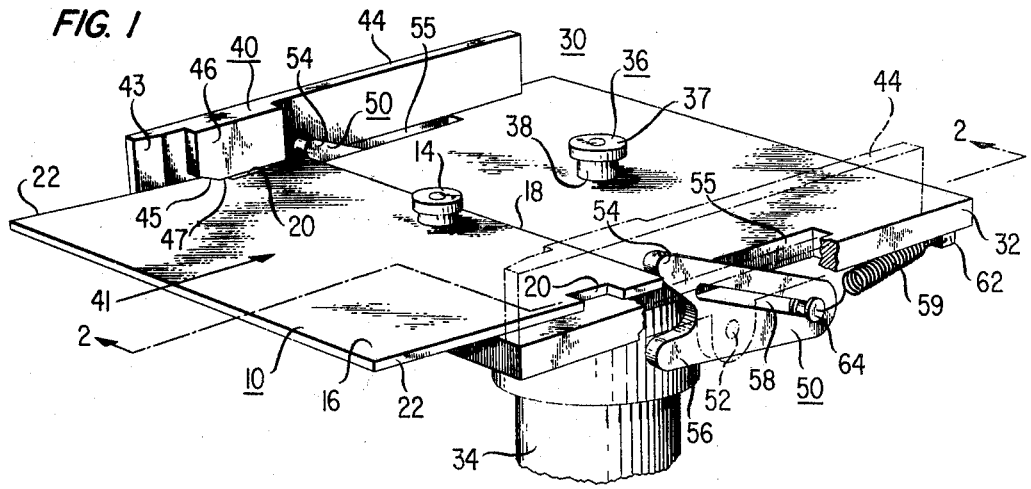
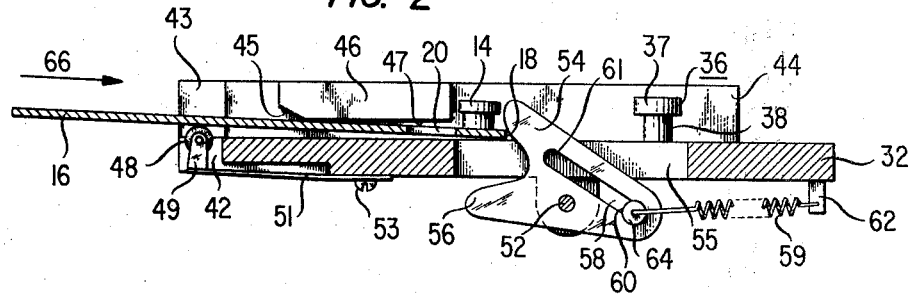
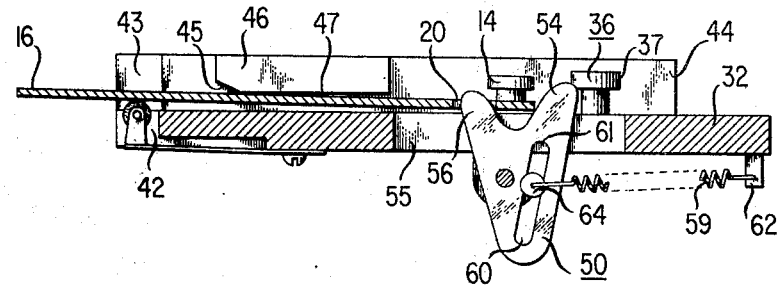
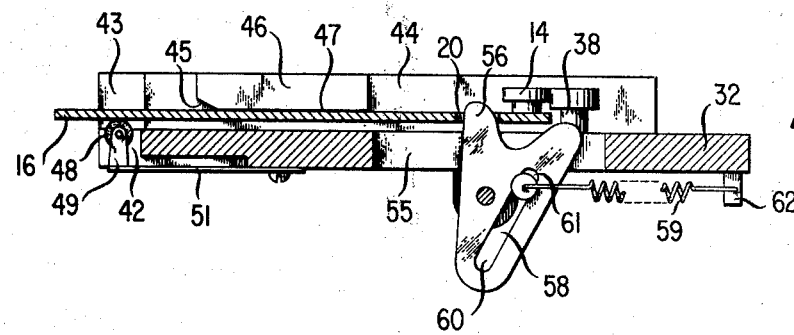
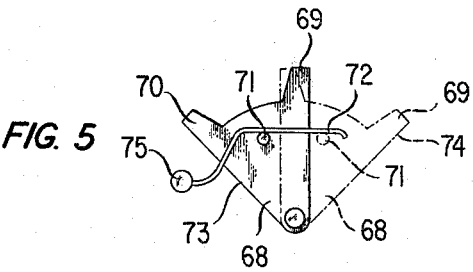

LOCKING AND DRIVE MECHANISM FOR MAGNETIC TAPE CARTRIDGE

BACKGROUND OF THE INVENTION

1. Field of the Invention

This invention relates to loading and drive mechanisms for cartridge-type tape recorders, and more particularly, such mechanisms for single-drive tape recorders adapted for receiving magnetic tape cartridges having a notch on either side edge.

2. Description of the Prior Art

It is desirable in tape recorders adapted for receiving magnetic tape cartridges to have means for firmly and accurately positioning the cartridge three dimensionally. Prior art loading devices are complicated mechanisms and often these devices, such as that disclosed in Anthony Loeschner-Robert A. Wolf U.S. Pat. No. 3,485,500, do not supply a vertical force on the inserted cartridge for three-dimensional alignment. This can cause misalignment of the tape with respect to the playing instrumentalities.

It is also desirable that the driving apparatus be mounted in a rigid arrangement. In prior art loading and drive systems, the drive motor is typically brought into contact with the belt capstan of the magnetic tape cartridge. After the cartridge is locked in an aligned position, the capstan drive, which extends from the spring-mounted drive motor, is spring loaded against the belt capstan, exerting against it a predetermined driving force. Such a motor mounting arrangement is complex and risky, and especially prone to jarring during transport of the tape recorder. The jarring may affect the performance of the motor, reducing its reliability as a driving mechanism. A spring loaded motor is also more prone to producing capstan misalignment problems.

Therefore, it would be advantageous to have a simple mechanism that can both hold a cartridge accurately in place three dimensionally and engage the cartridge against a stationary capstan drive for proper driving. It is also desirable that the mechanism be rugged and have substantially no movable parts during transport.

SUMMARY OF THE INVENTION

Accordingly, one object of the present invention is to accurately position a tape cartridge in three-dimensional space.

A second inventive object is to load the tape cartridge against the stationary capstan drive with the proper driving force.

A third inventive object is to provide a loading and drive mechanism which is simple, yet reliable and accurate.

A fourth inventive object is to provide a loading and drive mechanism which is rugged and has substantially no movable parts during transport.

The foregoing objects and others are achieved by the utilization of two simple overcenter loading cams which urge the tape cartridge vertically against reference surfaces and horizontally against a stationary capstan drive with the proper driving force, thereby reliably positioning the cartridge in the tape recorder. Alignment of the tape cartridge with respect to the capstan drive simultaneously positions the cartridge with respect to the other playing instrumentalities in the tape recorder.

The loading and drive mechanism is quite simple yet rugged. The proper driving force is maintained by the cams pressing the cartridge against the drive roller of the stationary capstan drive. As the capstan drive is a stationary hardstop for the inserted cartridge, the drive motor is no longer spring-mounted. Hence, it is more rugged, and there is less chance of shaft deformation or jarring of the mounting arrangement from handling. The stationary positioning of the capstan drive also assures greater alignment of the magnetic tape cartridge with respect to the tape head, which is advantageously aligned with respect to the stationary capstan drive. The overcenter loading cams are not subject to jarring during transport. A substantial force must be exerted against the cams before they can be operated, hence, any normal movement during transportation will not affect their loading and drive performance.

The invention and its further objects, features, and advantages will be readily discerned from a reading of the description to follow of illustrative embodiments.

BRIEF DESCRIPTION OF THE DRAWING

FIG. 1 is a perspective view of the mechanism partially in section constructed in accordance with the present invention with the magnetic tape cartridge partially inserted;

FIG. 2 is a sectional view of the mechanism along line 2—2 of FIG. 1 during initial insertion of the magnetic tape cartridge;

FIG. 3 is the sectional view of mechanism shown in FIG. 2 when the cartridge is partially engaged in the tape recorder;

FIG. 4 is the sectional view shown in FIG. 2 of the mechanism when the cartridge is in final engagement in the tape recorder; and FIG. 5 is a sectional view of a second embodiment of the cam means constructed in accordance with this invention.

DETAILED DESCRIPTION

Shown in FIG. 1 is a baseplate-mounted cartridge 10, similar to the structure described in Robert A. Von Behren U.S. Pat. No. 3,692,255, issued Sept. 19, 1972, in which cartridge 10 comprises two tape reels (not shown) and a belt capstan 14 mounted on a baseplate 16; the shell and other parts of cartridge 10, not material to the present invention, have been omitted from FIG. 1 for the sake of clarity.

Baseplate 16 of cartridge 10 is substantially rectilinear, having a forward edge 18 and a notch 20 on either side edge 22. Belt capstan 14, which drives the tape reels with a drive belt (not shown), and the tape reels are advantageously aligned with respect to baseplate 16. In the preferred embodiment of the invention, the baseplate surfaces are used to position cartridge 10 in tape recorder 30; the baseplate side edges 22 protrude beyond the cartridge shell on either side of the cartride (the cartridge shell is not shown).

While the invention is advantageously disclosed for loading a base-plate mounted cartridge, it is appreciated that the loading and drive mechanism, constructed in accordance with this invention, is suitable for any rectilinear magnetic tape cartridge having a forward edge and a notch on either side edge.

It may sometimes be advantageous to utilize the surfaces of the cartridge shell along with the cartridge base as the cartridge positioning surfaces for alignment in the tape recorder. It is also appreciated that cartridge 10 may consist of a pinch roller (not shown) rather than a belt capstan 14, by which the cartridge magnetic tape is then directly driven.

Also shown in FIG. 1 is a simplified version of a typical single-drive tape recorder 30, illustrating only so much of the tape recorder as is necessary to orient and explain the invention. Rigidly mounted to a mainplate 32 is a drive motor 34. A capstan drive 36 which comprises a drive roller 37 and a drive shaft 38 extends from drive motor 34. Capstan drive 36, while capable of rotation about its shaft's axis, is traversely fixed in position, forming a hardstop against further movement of cartridge 10 in tape recorder 30 as constructed in accordance with this invention.

To guide cartridge 10 towards capstan drive 36 is a bed 40 which forms a cartridge receiving path depicted by arrow 41. Bed 40 comprises mainplate 32, which forms a platform, with sidewalls 44 mounted near either side edge of mainplate 32. At the cartridge receiving end of bed 40, the sidewalls 44 advantageously have tapered surfaces 43 to facilitate cartridge insertion into path 41. The surfaces of sidewalls 44 and mainplate 32 guide cartridge 10 to assure ease of entry of cartridge 10 during insertion. The sidewalls 44 are advantageously made of a low-friction material which has good dimensional stability; such materials are conventionally known in the art. It is appreciated that sidewalls 44 may be flanged at their base to form guiding surfaces in place of the guiding surface provided by mainplate 32.

Extending from each side wall 44 is a projection 46 which hangs over mainplate 32. The bottom surface of each projection 46, which substantially faces mainplate 32, is accurately aligned with respect to capstan drive 36 to form a vertical reference surface 47, against which baseplate 16 is lodged upon final engagement of cartridge belt capstan 14 to drive roller 37. Advantageously, there is substantial leeway for baseplate 16 between reference surfaces 47 and mainplate 32. This is desirable in easing cartridge entry and reducing potential wearing of the guiding surfaces from repeated insertion of cartridge 10. Also, the projections 46 advantageously have tapered surfaces 45 to further facilitate cartridge insertion.

While the cartridge receiving path 41 in the preferred embodiment is not enclosed, it is appreciated that in some circumstances, an enclosed cartridge receiving cavity is desirable in which the ceiling is advantageously used as vertical reference surface 47'. This is preferable where the cartridge shell surfaces are used to position the cartridge 10' in tape recorder 30'.

Near each side wall 44 is a cam means constructed in accordance with this invention. Each cam means comprises an overcenter loading cam 50 pivotally mounted to mainplate 32 with a pin 52, as shown in FIG. 1. Cams 50 rotate about an axis substantially parallel to cartridge forward edge 18 upon cartridge insertion in bed 40. To permit access of cams 50 into cartridge receiving path 41 are openings 55 in mainplate 32 near the side walls 44, also illustrated in FIG. 1.

In the preferred embodiment of the loading and drive mechanism, each overcenter loading cam 50 has a first finger 54 that protrudes into cartridge receiving path 41 prior to substantial insertion of tape cartridge 10, and a second finger 56 that protrudes into cartridge receiving path 41 against the corresponding cartridge notch 20 on either side edge of baseplate 16 during final engagement of cartridge 10 with capstan drive 36.

Each cam 50 has a slot 58 substantially along the length of first finger 54.

In each cam means a coil spring 59 is attached to the corresponding cam 50 in slot 58 at one end and fixed at the other, advantageously to mainplate 32 with pin 62 as depicted in FIG. 2. Preferably, each coil spring 59 is supported on a spring slide 64, or equivalent, to permit easy movement of coil spring 59 along the length of the corresponding cam slot 58. Each spring 59 has a first and second stable position at either slot end, 60 and 61 respectively, toward which the spring end, which is attached to cam slot 58, moves. In turn, each spring 59 biases the corresponding cam 50 toward a first and second stable state.

During final engagement between cartridge 10 and capstan drive 36, a means for urging cartridge 10 against the vertical reference surfaces 47 to supplement the upward forces of the cams 59 is desirable. In the preferred embodiment, a low-friction roller 48 supplies a gentle upward pressure near the entrance of bed 40 against cartridge 10 upon cartridge insertion. As shown in FIG. 2, roller 48 is mounted on holder 49 in a recess 42 of mainplate 32. Holder 49 is supported by a leaf spring 51 that is attached to mainplate 32 with pin 53; holder 49 may be formed as an integral part of leaf spring 51. Roller 48 protrudes into cartridge receiving path 41.

To provide a more complete understanding of the invention, the operation of the locking and drive mechanism of the preferred embodiment is explained in further detail. Only one of the cam means is illustrated.

Referring to FIG. 2 of the drawing, cartridge 10 has been manually inserted into bed 40. The side edges 22 of cartridge baseplate 16 are laterally positioned during cartridge insertion by the guiding surfaces of bed 40 to prevent twisting and turning of cartridge 10. As cartridge 10 is moved toward capstan drive 36 by manual force exerted in the direction depicted by arrow 66; forward edge 18 of cartridge baseplate 16 contacts the first finger 54 of each cam 50 at either side of bed 40. Further manual insertion causes the rotation of cams 50 in the clockwise direction as viewed in FIG. 3 about their pivotal axes. The cams 50 tend to resist the insertion of cartridge 10 at this point due to the biased force of the coil springs 59 towards their first stable position 60, as depicted in FIG. 2. As the cams 50 rotate clockwise, the second fingers 56 of cams 50 enter cartridge receiving path 41, engaging the corresponding cartridge notches 20. At the same time, the coil springs 59 move upward along the corresponding cam slots 58.

After substantial rotation of cams 50, spring 59 of each cam means has moved into an overcenter position along cam slot 58 whereby spring 59 no longer resists the clockwise rotation of the corresponding cam 50 as illustrated in FIG. 3. Each spring 59 then seeks its second stable position 61. Shown in FIG. 4 each spring 59 in biasing towards position 61, urges the corresponding cam 50 to rotate further in the clockwise direction. Each cam 50, in turn, pulls cartridge 10 further into cartridge receiving path 41 with its second finger 56; this pull can be felt by the hand manually inserting cartridge 10 and is a reliable indication that cartridge 10 is being placed in full engagement with drive roller 37.

The cams 50 rotate further until the second fingers 56 urge, through their contact with corresponding cartridge notches 20, cartridge belt capstan 14 horizontally against drive roller 37 as illustrated in FIG. 4, advantageously with a predetermined driving force. Simultaneously through the same points of contact therewith, the second fingers 56 also urge cartridge 10 against the vertical reference surfaces 47. Near the entrance of bed 40 roller 48 urges cartridge 10 to lodge against the vertical reference surfaces 47 thereby ensuring that cartridge baseplate 16 is completely normal to capstan drive shaft 38, as shown in FIG. 4.

To eject cartridge 10 a manual force must be applied to pull cartridge 10 out of bed 40, during which there is resistance by the cam means initially, as the springs 59 are biased toward their second stable position 61. Similar to the cartridge insertion operation, as manual force is exerted to remove cartridge 10, the cams 50 rotate to gradually cause the springs 59 to move past an overcenter point along the corresponding cam slots 58. Accordingly, the springs 59 move toward their first stable positions 60, rotating the cams even further to create a "pushing out" force against cartridge 10 which can be felt by hand, thereby ensuring that ejection has occurred.

FIG. 5 shows another embodiment of the loading and drive mechanism constructed in accordance with this invention. Each cam means comprises an overcenter loading cam 68 having a first finger 69 to be contacted by cartridge forward edge 18 during cartridge insertion, and a second finger 70 for engaging cartridge 10 through the corresponding cartridge notch 20 in response to substantial cartridge insertion. A cam pin 71 is mounted to the surface of cam 68, the surface of said cam being substantially perpendicular to the cam's pivotal axis; cam pin 71 is preferably made of low friction material.

A leaf spring 72 is fixedly mounted at one end, preferably to mainplate 32 at point 75, and in slidable contact along its length with cam 68 through pin 71. Cam 68 is biased toward a first state 73 by spring 72 prior to substantial insertion of cartridge 10, as shown in FIG. 5. Also, illustrated in FIG. 5 is a dotted outline of cam 68 being biased towards a second state 74 by spring 72 during engagement of cartridge 10 against drive roller 37.

Upon rotation of cam 68 in response to contact by cartridge foward edge 18 during manual insertion of cartridge 10, cam pin 71 rotates also in the clockwise direction as viewed in FIG. 5. At the same time, pin 71 moves along the length of spring 72 to the right and displaces spring 72 vertically in the upward direction as pin 71 rotates. As spring 72 seeks its original undisplaced position, it resists the rotation of cam 68, biasing cam 68 toward first stable state 73.

As cam 68 rotates further, pin 71 reaches an overcenter point along the length of spring 72 where the clockwise rotation is no longer resisted by spring 72. Instead, spring 72, in seeking its original undisplaced position, urges pin 71 further along its length, biasing cam 68 toward second stable state 74.

Also, as cam 68 rotates, cam second finger 70 enters path 41 to engage the corresponding cartridge notch 20 and to cause further insertion of cartridge 10. Upon engagement of belt capstan 14 against drive roller 37, cam rotation ceases, as does further movement of pin 71 along spring 72. During final engagement, second finger 70 urges cartridge 10 vertically against vertical reference surfaces 47, as well as horizontally against drive roller 37.

While the invention has been particularly shown and described with reference to preferred embodiments thereof, it will be understood by those skilled in the art, that the foregoing and other changes in form and details may be made therein without departing from the spirit and scope of the invention.

What is claimed is:
 1. Apparatus for positioning a magnetic tape cartridge with respect to a stationary capstan drive, the magnetic tape cartridge being substantially rectilinear and having a forward edge and a notch on either side edge, comprising:
   a bed for receiving the cartridge;
   reference surface means in the bed for laterally positioning the cartridge side edges during insertion of the cartridge in the bed, and for vertically positioning the cartridge; and
   cam means having a first surface contacted by the cartridge forward edge during the insertion, and a second surface responsive to substantial insertion of the cartridge for engaging the cartridge through the notch, to position the cartridge with respect to the capstan drive, and to urge the cartridge through the same point of contact therewith, into engagement with the vertical reference surface, thereby vertically loading the cartridge with respect to said capstan drive.

2. An apparatus as claimed in claim 1 wherein the cam means comprises:
   a cam, pivotally mounted on an axis substantially parallel to said cartridge forward edge upon insertion in said bed, comprising:
   a first finger to be contacted by said cartridge forward edge during cartridge insertion,
   a second finger for engaging said cartridge through said corresponding cartridge notch in response to substantial cartridge insertion;
   a slot; and
   a coil spring, held fixed at one end and at the other end slidably engaged to said cam along said slot, the spring having a first and second stable position at either slot end, whereby prior to cartridge insertion, the spring is biased toward said first stable position, and thereafter in response to rotation of said cam due to substantial cartridge insertion, said spring moves toward said second stable position at the other end of said slot, thereby urging the attached cam to urge said cartridge against said capstan drive.

3. An apparatus as claimed in claim 1 wherein the cam means comprises:
   a cam, pivotally mounted on an axis substantially parallel to said cartridge forward edge upon insertion in said bed, comprising:
   a first finger to be contacted by said cartridge forward edge during cartridge insertion, and
   a second finger for engaging said cartridge through said corresponding cartridge notch in response to substantial cartridge insertion;
   a pin mounted to said cam surface, said cam surface being substantially perpendicular to said cam's pivotal axis; and
   a leaf spring, fixed at one end and along its length in slidable contact with said cam through said pin, wherein during rotation of said cam due to substantial cartridge insertion, said pin moves along the length of said leaf spring, said pin simultaneously deflecting said leaf spring from its stable position, said leaf spring, responding to reduce its deflection, urging further movement of said pin along its length, and said pin, in turn, urging said cam to rotate, thus causing said cam second finger to urge said cartridge against said capstan drive.

4. An apparatus as claimed in claim 1 wherein the magnetic tape cartridge comprises a baseplate upon which the reels are mounted, said baseplate being substantially rectilinear and having a forward edge and a notch on either side edge.

5. An apparatus as claimed in claim 1 wherein the reference surface means comprises:
   a pair of side walls in said bed to prevent lateral twisting of said cartridge during cartridge insertion, and to position laterally said cartridge side edges upon cartridge insertion; and
   a pair of vertical reference surfaces, each projecting from said corresponding side walls to vertically position said cartridge, said vertical reference surfaces being accurately aligned with respect to said capstan drive.

6. An apparatus as claimed in claim 1 comprising:
   a means for urging said cartridge against said vertical reference surfaces near the entrance of said bed.

* * * * *